United States Patent

[11] 3,600,666

[72] Inventor John H. Gliever
San Jose, Calif.
[21] Appl. No. 21,116
[22] Filed Mar. 19, 1970
[45] Patented Aug. 17, 1971
[73] Assignee Hewlett-Packard Company
Palo Alto, Calif.

[54] SWITCHING REGULATOR POWER SUPPLY INCLUDING FAST TURNOFF MEANS FOR SWITCHING TRANSISTOR
6 Claims, 2 Drawing Figs.
[52] U.S. Cl. .................................................. 323/22 T, 323/DIG. 1
[51] Int. Cl. ...................................................... G05f 1/56
[50] Field of Search .......................................... 307/297; 323/DIG. 1, 18, 19, 22 T, 38

[56] References Cited
UNITED STATES PATENTS

| | | | |
|---|---|---|---|
| 3,368,139 | 2/1968 | Wuerflein...................... | 323/22 T |
| 3,383,584 | 5/1968 | Atherton....................... | 323/DIG. 1 |
| 3,462,643 | 8/1969 | Turner et al. ................. | 323/22 T |
| 3,473,049 | 10/1969 | Alexander..................... | 307/297 X |

Primary Examiner—William H. Beha, Jr.
Assistant Examiner—A. D. Pellinen
Attorney—A. C. Smith ABSTRACT: A pulse transformer is added to a switching regulator power supply by placing its primary in series with the commutating diode and its secondary between the emitter and the base of the switching transistor through a bias resistor. When the switching transistor starts to turn off, a pulse from the transformer helps turn off the switching transistor faster by removing the stored charge from the base, thus reducing power dissipation in the transistor.

INVENTOR

JOHN H. GLIEVER

SWITCHING REGULATOR POWER SUPPLY INCLUDING FAST TURNOFF MEANS FOR SWITCHING TRANSISTOR

BACKGROUND AND SUMMARY OF THE INVENTION

A switching regulator power supply is comprised of a variable pulse width pulse generator, a switch, a filter and a feedback circuit. one employing power supply maintains a constant voltage at its output with changes in voltage at its input or changes in output current by varying the pulse width to the switch in response to the feedback circuit. The filter smooths out the voltage pulses from the switch. The output voltage is higher for greater switch on/off ratios, and is lower for smaller on/off ratios. In order that the filter components may be small, the switching frequency is much high than AC line frequency, usually 10 to 20 kHz. This type of power supply is more efficient than one employing a variable resistance pass element, such as a transistor, because the switch is either a short or an open circuit and thus dissipates no power, in the ideal case.

A power transistor is commonly used as the switch, but for high switching speeds and high levels of current, the transistor dissipates more power than an ideal switch because of the finite amount of time required to turn the transistor off. The turnoff time is primarily determined by the amount of time necessary for the stored charge in the base region to bleed off after the bias current has been removed from the base. In the preferred embodiment of the present invention the primary of a pulse transformer is placed in series with the commuting diode and the secondary is connected between the base and the emitter of the transistor through a bias resistor. When the pulse generator signal falls and the transistor starts to turn off, the commutating diode turns on to keep current flowing through the filter; and this current passing through the pulse generator primary generates a voltage spike in the secondary. The transformer is phased such that a voltage that is negative with respect to the emitter is placed on the base, and this negative voltage draws the stored charge out of the base, thus turning the transistor off more quickly, and reducing dissipation.

DESCRIPTION OF THE PREFERRED EMBODIMENT

Figure 1:
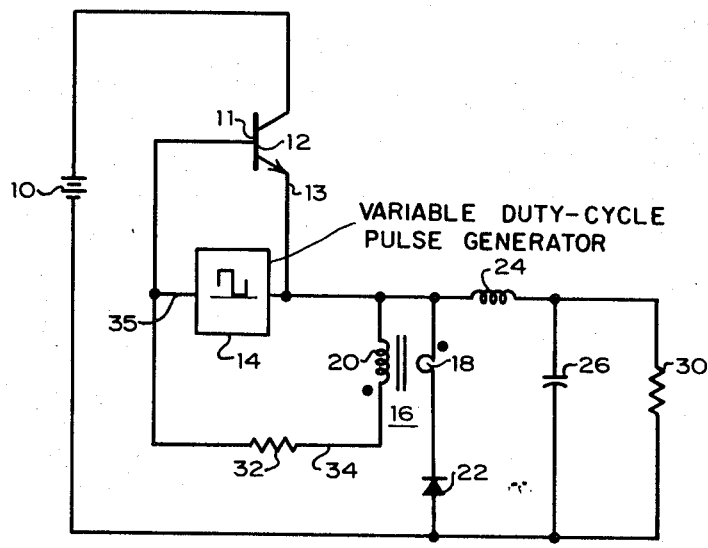
FIG. 1 is a schematic diagram of the preferred embodiment of the invention.

As shown in FIG. 1, the positive side of DC power source 10 is connected to the collector of transistor 12. Connected between emitter 13 and base 11 of transistor 12 is variable duty-cycle pulse generator 14, as well as secondary 20 of pulse transformer 16 in series with bias resistor 32. Inductor 24 is connnected in series with emitter 13 and the parallel combination of capacitor 26 and load 30. The negative side of DC power source 10 is connected to capacitor 26, load 30, and the anode of diode 22. Primary 18 of pulse transformer 16 is connected between emitter 13 and the cathode of diode 22.

Figure 2:
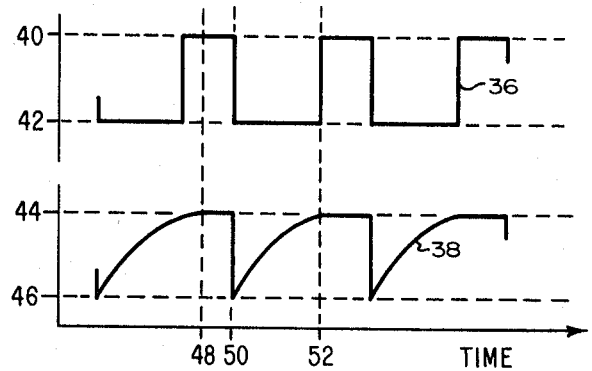
FIG. 2 is a diagram of the waveforms applied to the base of the transistor in the preferred embodiment.

Referring to FIG. 2, waveform 36 is applied to base 11 by pulse generator 14 on wire 35 and waveform 38 is applied to base 11 by secondary 20 of pulse transformer 16 on wire 34 through resistor 32. With reference to FIGS. 1 and 2, assume that at time 48 pulse 36 on wire 35 is at current level 40, that is, current is being sourced to base 11 by pulse generator 14 and the transistor is conducting. At current level 42 pulse generator 14 is sourcing zero current. Current is flowing out of emitter 13 through inductor 24 to supply charge to capacitor 26 and power to load 30. Act time 50, FIG. 2, the output level of pulse generator 14, waveform 36, falls to zero current and transistor 12 starts to turn off. As the current drops through inductor 24, a back EMF will appear across it, which will forward bias diode 22, and current will be supplied to inductor 24 through diode 22. The sudden surge of current through primary 18 of pulse transformer 16 will generate a voltage pulse in secondary 20 which is negative with respect to the voltage on emitter 13 due to the phasing of the windings of pulse transformer 16. Level 44 in FIG. 2 is at approximately the same level as emitter 13, and at time 50, base 11 will drop to level 46. The stored charge in base 11 will be drained out quickly, thus stopping the conduction in transistor 12. After the initial surge of current diode 22 and primary 18, waveform will rise back to level 44. At time 52 the waveform 36 of pulse generator 14 again rises to positive voltage level 40 and transistor 12 is turned on, back biasing diode 22 and supplying current to inductor 24.

It should be understood that equivalent circuits within the scope of this invention can be built with different polarity power sources and transistors than those shown in FIG. 1 by anyone skilled in the art.

I claim:

1. In an electronic apparatus including:
  a signal source:
  a switching means connected in series with the signal source and having a control input to govern the conductivity of the switching means:
  an inductor connected in series with the switching means:
  a load connected in series with the inductor and the signal source: and
  a unidirectional conducting device connected in parallel with the series combination of the inductor and the load:
  an improvement comprising:
  a transformer having a primary and a secondary winding, the primary winding of the transformer being connected to the unidirectional conducting device for sensing changes in the current flowing through the unidirectional conducting device: and
  the secondary winding of the transformer being connected between the switching means control input and the junction between the switching means and the inductor for applying a signal to said control input to alter the conductivity of the switching means in response to a change in the current flowing through the unidirectional conducting device.

2. An electronic apparatus as in claim 1 wherein:
  the switching means is a transistor having a base electrode, there being a signal path between the base and the secondary, the base forming the control input.

3. An electronic apparatus as in claim 2 wherein:
  the signal source is a source of DC power and the apparatus is a switching regulator power supply.

4. A switching regulator power supply as in claim 3 wherein:
  there is a capacitor in parallel with the load.

5. A switching regulator power supply as in claim 3 wherein:
  the signal path between the base and the secondary is a resistor.

6. A switching regulator power supply as in claim 3 wherein:
  a variable pulse width pulse generator supplies a control signal to the control input.

UNITED STATES PATENT OFFICE
CERTIFICATE OF CORRECTION

Patent No. 3,600,666            Dated August 17, 1971

Inventor(s) John H. Gliever

It is certified that error appears in the above-identified patent and that said Letters Patent are hereby corrected as shown below:

Column 1, line 9, "one employing" should read -- The --; line 29, "commuting" should read -- commutating --;

Column 2, line 3, "Act" should read -- At --.

Signed and sealed this 18th day of January 1972.

(SEAL)
Attest:

EDWARD M. FLETCHER, JR.            ROBERT GOTTSCHALK
Attesting Officer                  Acting Commissioner of Patents